US012501999B2

(12) United States Patent
Kokenge

(10) Patent No.: US 12,501,999 B2
(45) Date of Patent: Dec. 23, 2025

(54) SHELF SYSTEMS WITH SLIDING FOOT SLEEVES AND METHODS OF ASSEMBLING SHELF SYSTEMS THAT INCLUDE SLIDING FOOT SLEEVES

(71) Applicant: Organized Living, Inc., Cincinnati, OH (US)

(72) Inventor: John Kokenge, Cincinnati, OH (US)

(73) Assignee: Organized Living, Inc., Cincinnati, OH (US)

( * ) Notice: Subject to any disclaimer, the term of this patent is extended or adjusted under 35 U.S.C. 154(b) by 37 days.

(21) Appl. No.: 18/230,890

(22) Filed: Aug. 7, 2023

(65) Prior Publication Data

US 2025/0049213 A1 Feb. 13, 2025

(51) Int. Cl.
*A47B 91/12* (2006.01)
*F16B 12/44* (2006.01)

(52) U.S. Cl.
CPC .............. *A47B 91/12* (2013.01); *F16B 12/44* (2013.01); *A47B 2220/0027* (2013.01)

(58) Field of Classification Search
CPC . A47B 2220/00; A47B 2230/00; A47B 91/12; F16M 11/247; F16M 11/36
USPC .................................. 248/501, 188.8, 188.9
See application file for complete search history.

(56) References Cited

U.S. PATENT DOCUMENTS 3,727,328 A 4/1973 Valenzuela
4,088,229 A * 5/1978 Jacoby .................. A47B 91/00 211/183
5,624,098 A * 4/1997 McDowell ................ F24C 3/12 248/500
5,660,011 A * 8/1997 Bleeker ................. E04H 1/1266 312/351.3
6,409,129 B1 * 6/2002 Chen ...................... A47B 91/00 248/677
8,282,140 B1 10/2012 Joy
9,405,264 B2 * 8/2016 Ishiwata ................ A47B 91/08
9,528,797 B2 12/2016 Harwood et al.
10,088,094 B2 * 10/2018 Craig ....................... B61H 7/00
2003/0010886 A1 * 1/2003 Barnes .................... D06F 39/12 248/500

(Continued)

FOREIGN PATENT DOCUMENTS

CN 213282165 U 5/2021
KR 102181001 B1 11/2020

*Primary Examiner* — Alfred J Wujciak
(74) *Attorney, Agent, or Firm* — Dinsmore & Shohl LLP

(57) ABSTRACT

A method of assembling a shelf system is provided. The method includes placing a foot sleeve around a bottom portion of a side support panel. The foot sleeve includes a first sidewall configured to extend alongside an outer face of the side support panel, a second sidewall configured to extend alongside an inner face of the side support panel that faces opposite the outer face and an end wall configured to extend along a front face of the side support panel, the end wall connecting the first and second sidewalls. The first and second sidewalls and end wall define a volume that is sized to receive the side support panel. The side support panel is mounted to a wall such that the side support panel extends in a vertical direction and is perpendicular to the wall. The foot sleeve is slid toward a floor beneath the side support panel to cover a gap between the side support panel and the floor after mounting the side support panel to the wall.

15 Claims, 7 Drawing Sheets

(56) References Cited

U.S. PATENT DOCUMENTS

2004/0227039 A1 * 11/2004 Real .......................... A47B 91/06
248/188.8

* cited by examiner

SHELF SYSTEMS WITH SLIDING FOOT SLEEVES AND METHODS OF ASSEMBLING SHELF SYSTEMS THAT INCLUDE SLIDING FOOT SLEEVES

TECHNICAL FIELD

The present specification generally relates to shelf systems and, more specifically, to shelf systems that include a sliding foot sleeve and associated methods.

BACKGROUND

Many shelf systems are mounted to a wall which can add stability for the shelf systems once installed. The various rooms in which the shelf systems are installed can have their own space and obstacle constraints. Once the shelf systems or even portions of the shelf systems are mounted to the wall, it can be cumbersome to uninstall and readjust the positions of the shelf systems.

SUMMARY

In one embodiment, a method of assembling a shelf system is provided. The method includes placing a foot sleeve around a bottom portion of a side support panel. The foot sleeve includes a first sidewall configured to extend alongside an outer face of the side support panel, a second sidewall configured to extend alongside an inner face of the side support panel that faces opposite the outer face and an end wall configured to extend along a front face of the side support panel, the end wall connecting the first and second sidewalls. The first and second sidewalls and end wall define a volume that is sized to receive the side support panel. The side support panel is mounted to a wall such that the side support panel extends in a vertical direction and is perpendicular to the wall. The foot sleeve is slid toward a floor beneath the side support panel to fill a gap between the side support panel and the floor after mounting the side support panel to the wall.

In another embodiment, a shelf system includes a first side support panel, a second side support panel and a shelf that is configured to extend between the first side support panel and the second side support panel. A foot sleeve is configured to extend around a bottom portion of the first side support panel. The foot sleeve includes a first sidewall configured to extend alongside an outer face of the first side support panel, a second sidewall configured to extend alongside an opposite inner face of the first side support panel, and an end wall configured to extend along a front face of the first side support panel, the end wall connecting the first and second sidewalls. The first and second sidewalls and end wall define a volume that is sized to slidably receive the first side support panel.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Embodiments described herein are directed to shelf systems that include a foot sleeve that extends around a foot or bottom portion of a side support panel. The foot sleeve includes a first sidewall configured to extend alongside an outer face of the side support panel, a second sidewall configured to extend alongside an inner face of the side support panel that faces opposite the outer face a first end wall configured to extend along a front face of the side support panel, the first end wall connecting the first and second sidewalls. The foot sleeve may be placed around the bottom portion of the side support panel and then the side support panel can be vertically mounted to a wall at a desired location such that the bottom portion faces a floor of a room. The foot sleeve can then be slid toward the floor beneath the side support panel to cover a gap between the side support panel and the floor so that the foot sleeve is flush against the floor.

Figure 1:
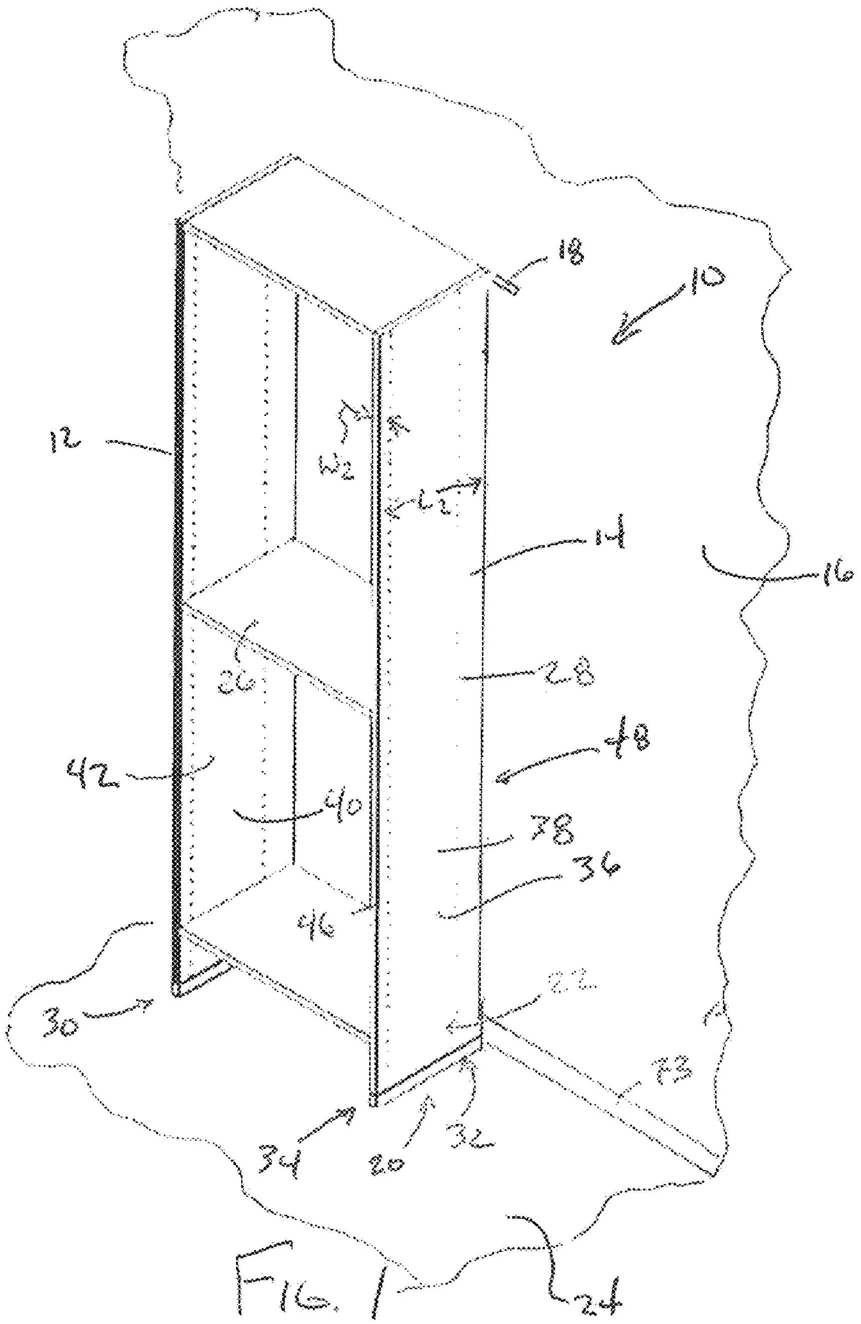
FIG. 1 depicts a perspective view of a shelf system including foot sleeve in a lowered configuration, according to one or more embodiments shown and described herein.

Referring to FIG. 1, a shelf system 10 includes a first side support panel 12 and a second side support panel 14 that faces the first side support panel 12. The first and second side support panels 12 and 14 may be mounted to a wall 16, for example, using a wall mount bracket 18. The first and second side support panels 12 and 14 may be mounted to the wall 16 such that bottom faces 20 (FIG. 12) of bottom portions 22 of the first and second side support panels 12 and 14 face a floor 24 and the first and second side support panels 12 and 14 are perpendicular to the floor 24 and the wall 16. Shelves 26 are mounted to the first and second side support panels 12 and 14, for example, using fasteners and mount holes 28. The shelves 26 extend horizontally and perpendicular to the first and second side support panels 12 and 14.

Located at the bottom portions 22 of the first and second side support panels 12 and 14 are foot sleeves 30 and 32. The foot sleeves 30 and 32 are sized to receive the bottom portions 22 of the first and second side support panels 12 and 14 and slide flush against the floor 24, covering a gap 34 between the first and second side support panels 12 and 14 and the floor 24 when the first and second side support panels 12 and 14 are mounted to the wall 16.

Figure 2:
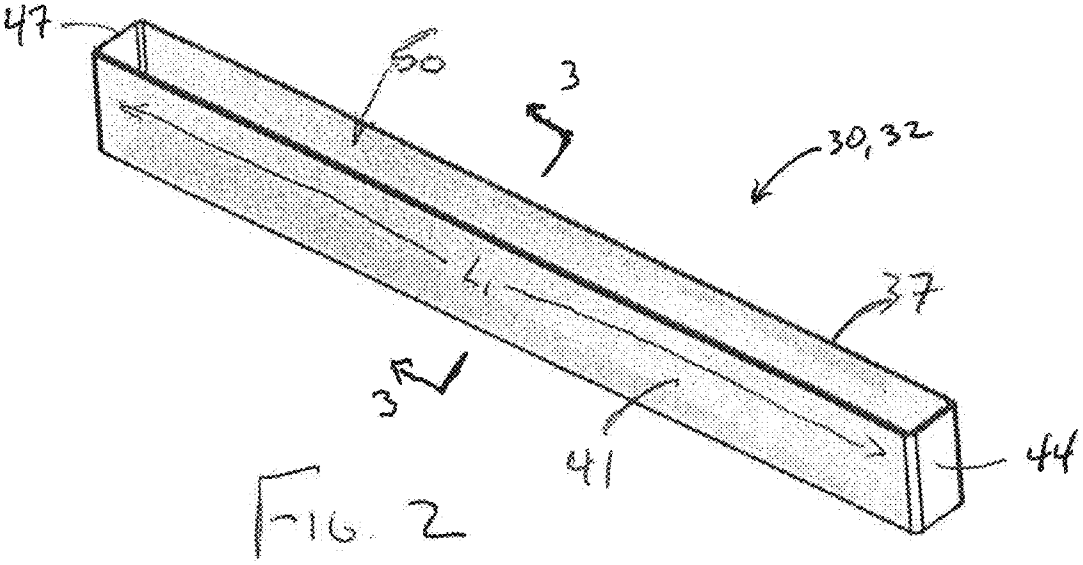
FIG. 2 depicts a perspective view of the foot sleeve of FIG. 1 in isolation, according to one or more embodiments shown and described herein.
Figure 3:
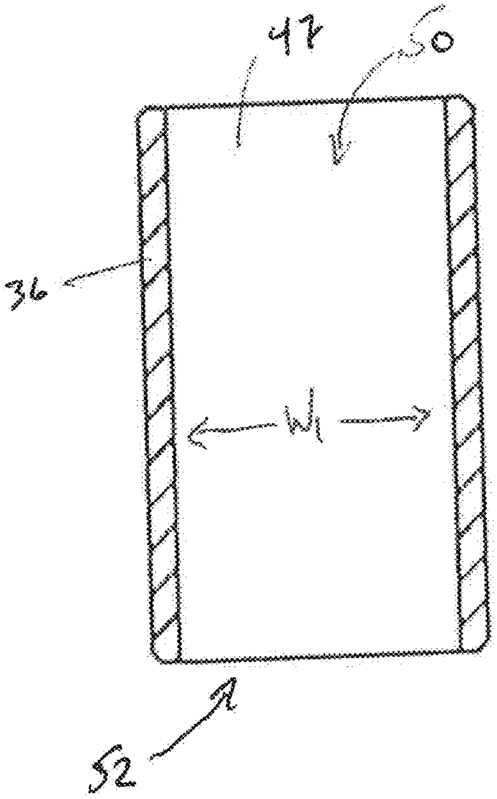
FIG. 3 depicts a section view along line 3-3 of FIG. 2, according to one or more embodiments shown and described herein.

Referring to FIGS. 2 and 3, an embodiment of the foot sleeve 30, 32 is illustrated in isolation and includes a first sidewall 37 configured to extend alongside outer faces 38 of the first and second side support panels 12 and 14, a second sidewall 41 configured to extend alongside an inner face 42 of the first and second side support panels 12 and 14, a first end wall 44 configured to extend along a front face 46 of the first and second side support panels 12 and 14, and a second end wall 47 configured to extend along a rear face 48 of the first and second side support panels 12 and 14. In some embodiments, the foot sleeve 30, 32 is dimensioned such that the first and second sidewalls and first and second end walls 37, 41, 44 and 47 remain in contact and are continuously contiguous along their entire lengths (but not necessarily their entire heights) with their respective faces 38, 42, 46 and 48 when placed around the first and second side support panels 12 and 14. The first and second end walls 44 and 47 connect and extend between the first and second sidewalls 37 and 41 thereby defining a volume 50 that is sized to receive the bottom portions 22 of the first and second side support panels 12 and 14. In particular, the foot sleeve 30, 32 may define the volume 50 such that the length $L_1$ of the volume 50 and the width $W_1$ of the volume are about the same as the length $L_2$ and width $W_2$ of the first and second side support panels 12 and 14, such as within about 0.5 inch, such as within about 0.4 inch, such as within about 0.3 inch, such as within about 0.2 inch, such as within about 0.1 inch. In this regard, the cross-sectional shape of the volume 50 and the first and second side support panels 12 and 14 may be considered the same. The dimensions of the volume 50 may also be fixed by forming the foot sleeve 30, 32 of an inextensible material (i.e., non-stretchy), such as a rigid plastic material, that is not intended to be easily stretched. In some embodiments, the volume 50 may be fixed by forming the foot sleeve 30, 32 of a flexible material such that the volume 50 or shape may temporarily change, but then return to its original dimensions.

Figure 4:
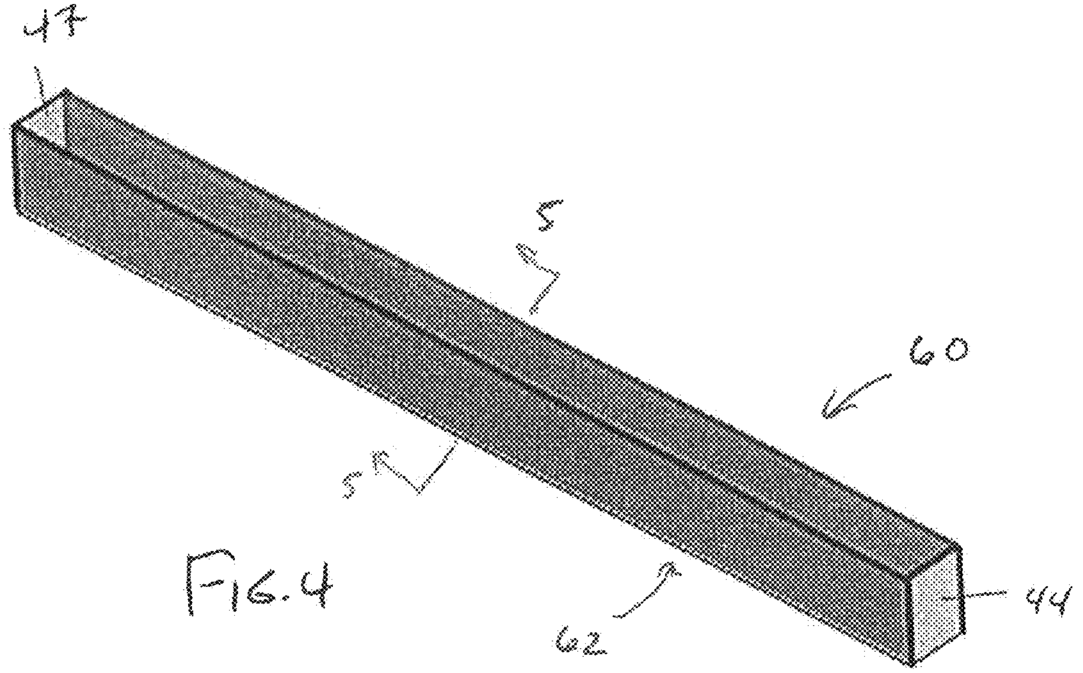
FIG. 4 depicts a perspective view of another embodiment of a foot sleeve, according to one or more embodiments shown and described herein.
Figure 5:
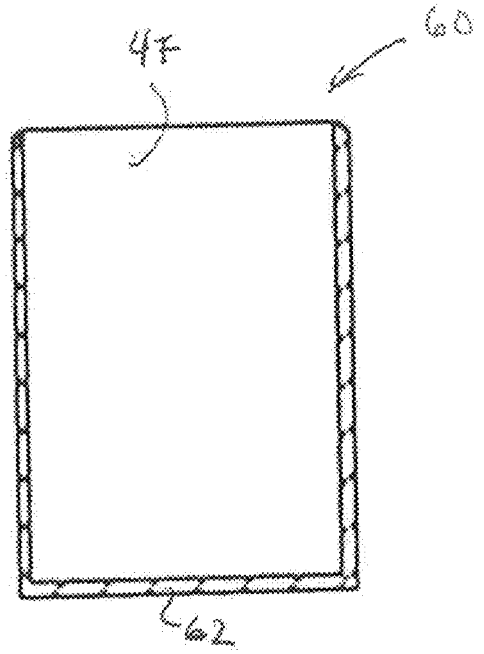
FIG. 5 depicts a section view along line 5-5 of FIG. 4, according to one or more embodiments shown and described herein.

In the embodiment of FIGS. 2 and 3, the foot sleeve 30, 32 is open at a bottom 52 such that there is no bottom wall beneath the volume 50. Referring now to FIGS. 4 and 5, another embodiment of a foot sleeve 60 includes many of the attributes of the foot sleeve 30, 32, except that the foot sleeve 60 includes a bottom wall 62. The bottom wall 62 can rest on the floor 24 underneath first and second side support panels 12 and 14.

Figure 6:
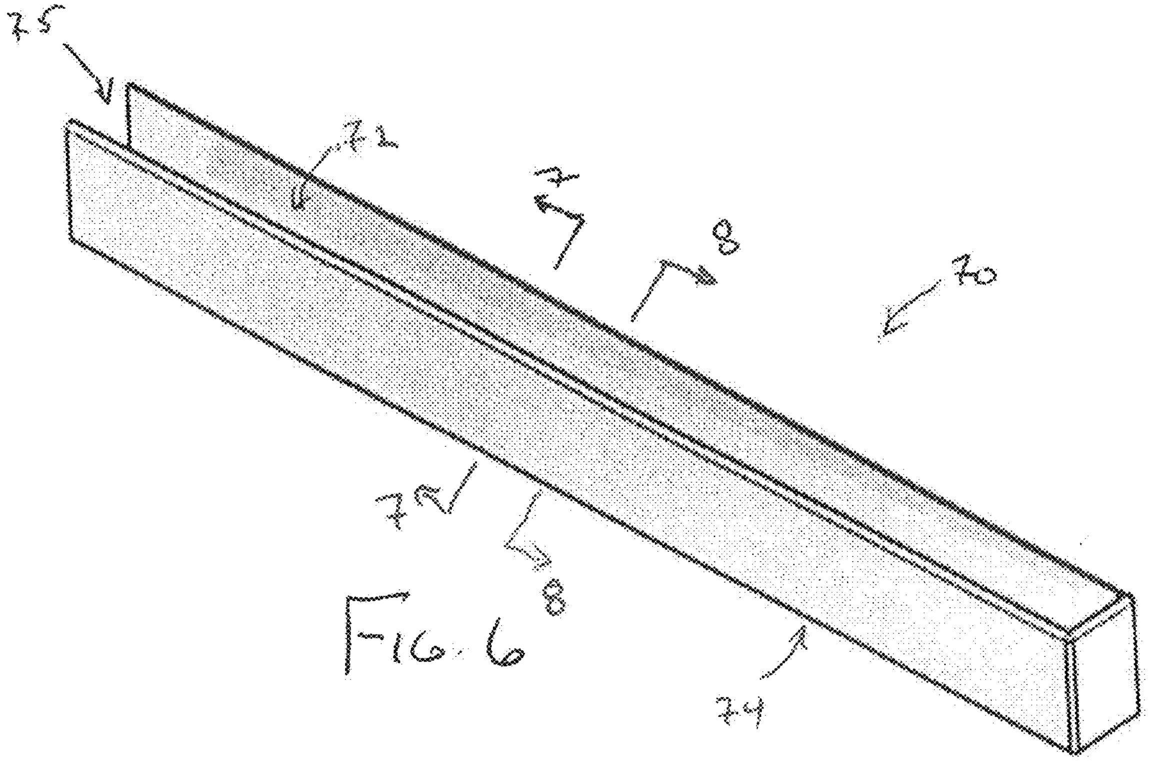
FIG. 6 depicts a perspective view of another embodiment of a foot sleeve, according to one or more embodiments shown and described herein.
Figure 7:
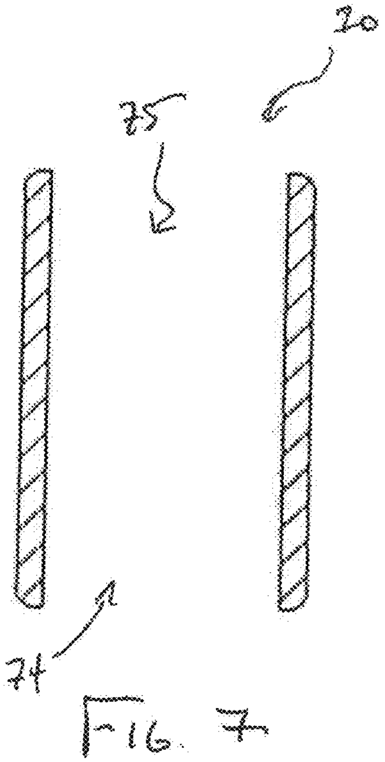
FIG. 7 depicts a section view along line 7-7 of FIG. 6, according to one or more embodiments shown and described herein.
Figure 8:
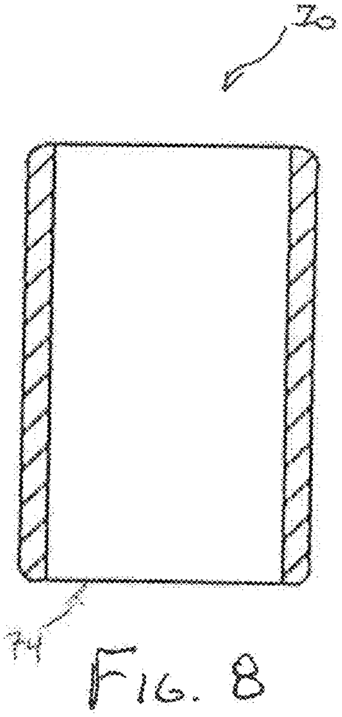
FIG. 8 depicts a section view along line 8-8 of FIG. 6, according to one or more embodiments shown and described herein.
Figure 9:
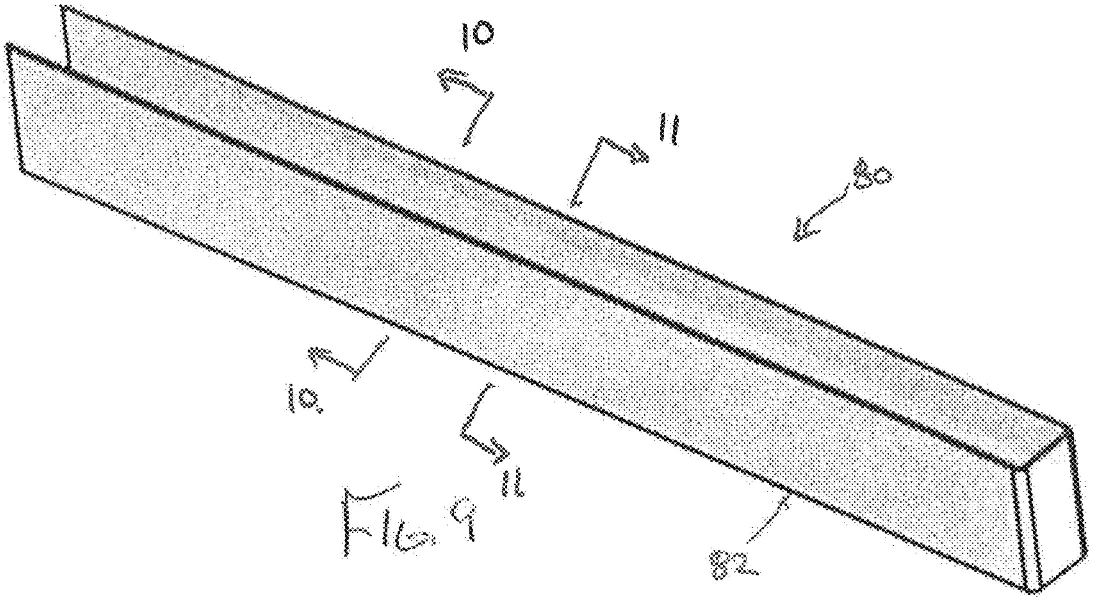
FIG. 9 depicts a perspective view of another embodiment of a foot sleeve, according to one or more embodiments shown and described herein.
Figure 10:
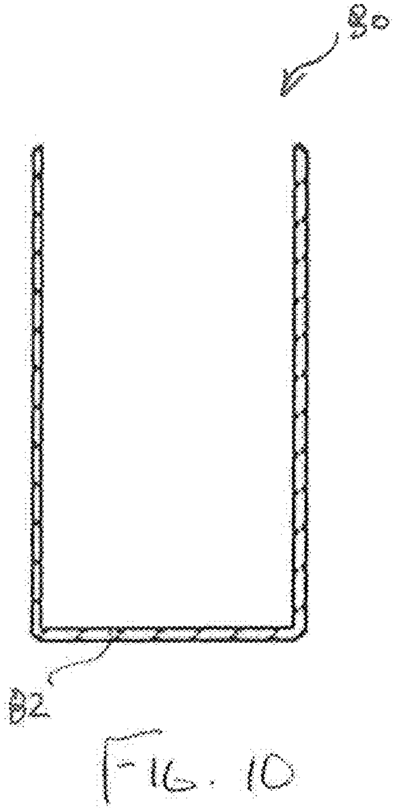
FIG. 10 depicts a section view along line 10-10 of FIG. 9, according to one or more embodiments shown and described herein.
Figure 11:
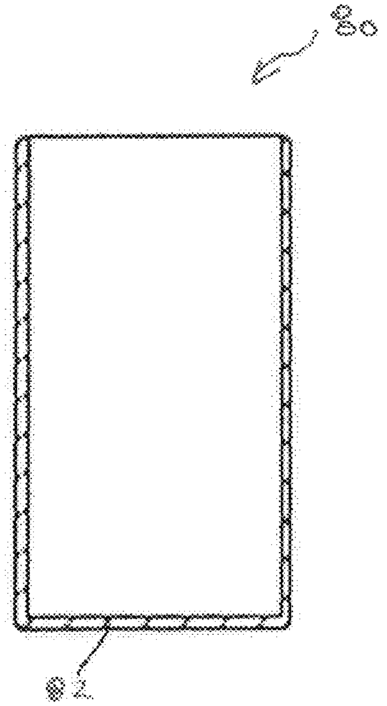
FIG. 11 depicts a section view along line 11-11 of FIG. 1, according to one or more embodiments shown and described herein.

In the embodiments of FIGS. 2-5, the foot sleeves, 30, 32 and 60 have both front and second end walls 44, 47. Referring to FIGS. 6-8, a foot sleeve 70 is illustrated includes many of the attributes described above, but a second end wall (or first end wall) is omitted forming a volume 72 having an open end 75. Such an arrangement can help to avoid a molding 73 that may be against the wall behind the shelf system 10 (FIG. 1). The foot sleeve 70 also has an open bottom 74. In another embodiment shown by FIGS. 9-11, a foot sleeve 80 is similar to the foot sleeve 70, except that the foot sleeve 80 has a bottom wall 82.

Figure 12:
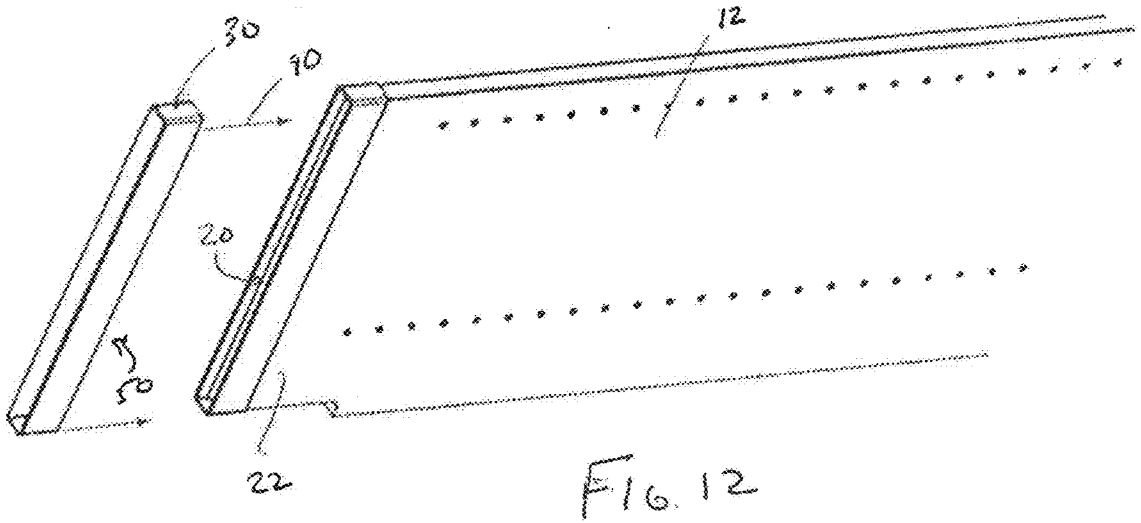
FIG. 12 depicts a step of forming the shelf system of FIG. 1, according to one or more embodiments shown and described herein.

Referring now to FIGS. 12-15, a method of installing the shelf system 10 includes applying the foot sleeve 30, 32 to the first and second side support panels 12 and 14 represented by arrows 90 in FIG. 12. In particular, the bottom portion 22 of the first and second side support panels 12 and 14 may be slid into the volume 50 such that the foot sleeve 30, 32 extends at least partially about a perimeter of the first and second side support panels 12 and 14. In the embodiment of foot sleeve 30, 32, the foot sleeve 30, 32 extends about the entire perimeter of the first and second side support panels 12 and 14. In the embodiment of foot sleeve 70, 80, the foot sleeve 70, 80 extends only partially about the perimeter of the first and second side support panels 12 and 14.

Figure 14:
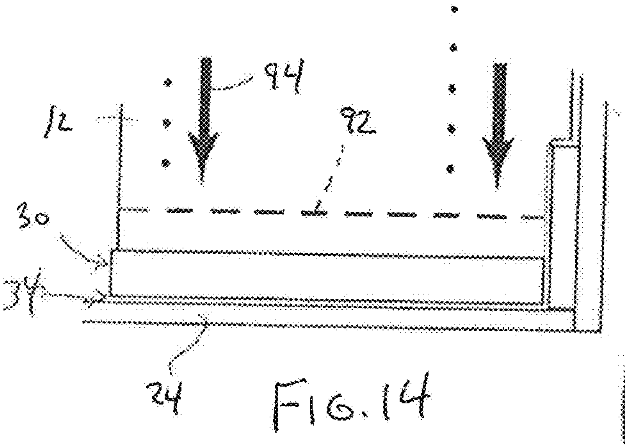
FIG. 14 depicts a step of forming the shelf system of FIG. 1, according to one or more embodiments shown and described herein.
Figure 15:
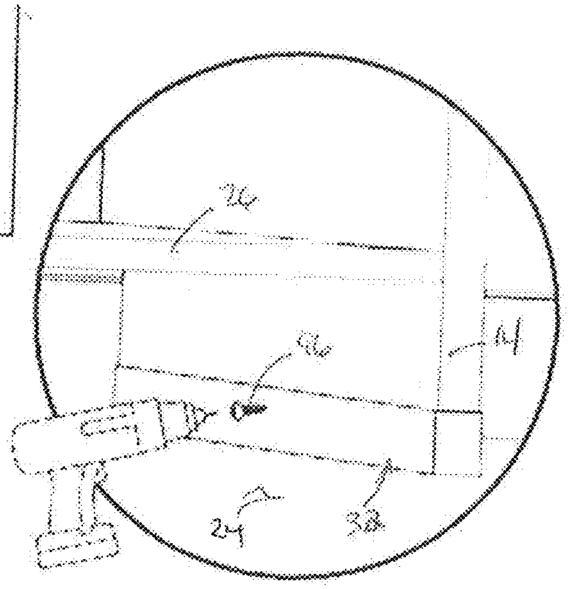
FIG. 15 depicts a step of forming the shelf system of FIG. 1, according to one or more embodiments shown and described herein.
Figure 13:
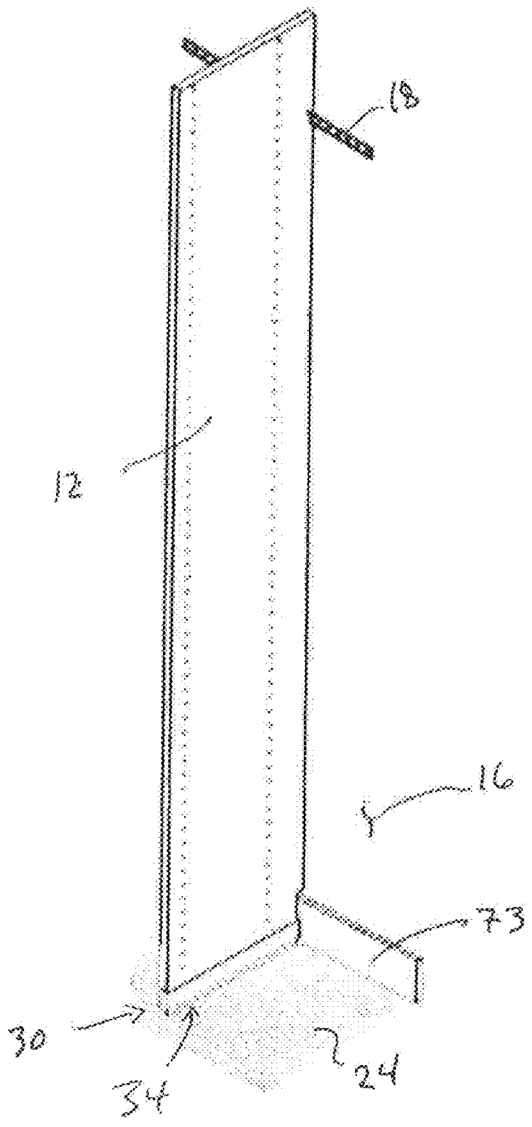
FIG. 13 depicts a step of forming the shelf system of FIG. 1, according to one or more embodiments shown and described herein.

As represented by FIG. 13, the first and second side support panels 12 and 14 may be mounted to the wall 16 with the foot sleeves 30 and 32 provided about their perimeters using the wall mount bracket 18. Referring also to FIG. 14, when first mounted to the wall 16, there may be a gap 34 between the first and second side support panels 12 and 14 and the floor 24. To cover the gap 34, the foot sleeve 30, 32 can be slid downward toward the floor 24 relative to the first and second side support panels 12 and 14 that are fixed, represented by the dashed line 92 and arrows 94. Referring to FIG. 15, when the foot sleeve 30, 32 is flush against the floor 24 or in a desired position relative to the first and second side support panels 12 and 14, a fastener 96 may be threaded through the foot sleeve 30, 32 and into the first and second side support panels 12 and 14 to hold the foot sleeve 30, 32 in place.

The above-described shelf systems allow for relatively simple installation of shelving compared to traditional fastener shelf systems in that the position of the first and second side support panels do not need to be flush against the floor and the foot sleeves can be used to give an appearance that the first and second side support panels are flush against the floor. The foot sleeves can be easily slid down into place relative to the first and second side support panels to complete the installation of the first and second side support panels. The foot sleeves can cover non-level floors or out of square wall to floor corners with little to no extra manipulation beyone sliding the foot sleeve into place. The shelf system can be provided with the foot sleeves as a kit, or the foot sleeves can be provided separately and then used to assemble a shelf system or to modify an already installed shelf system.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of assembling a shelf system, the method comprising:

placing a foot sleeve around a bottom portion of a side support panel, the foot sleeve comprising:

a first sidewall configured to extend alongside an outer face of the side support panel;

a second sidewall configured to extend alongside an inner face of the side support panel that faces opposite the outer face; and an end wall configured to extend along a front face of the side support panel, the end wall connecting the first and second sidewalls;

wherein the first and second sidewalls and end wall define a volume that is sized to receive the side support panel;

mounting the side support panel to a wall such that the side support panel extends in a vertical direction and is perpendicular to the wall; and sliding the foot sleeve toward a floor beneath the side support panel to cover a gap between the side support panel and the floor after the step of mounting the side support panel to the wall.

2. The method of claim 1, wherein after the step of sliding the foot sleeve toward the floor, the first sidewall engaging the outer face of the side support along an entire length.

3. The method of claim 1, wherein the end wall is a first end wall, the foot sleeve comprising a second end wall at an end opposite the first end wall.

4. The method of claim 1, wherein the volume is open at an end opposite the first end wall.

5. The method of claim 1, wherein the foot sleeve comprises a bottom wall that covers a bottom area of the volume.

6. The method of claim 1, wherein the volume is open at a bottom of the foot sleeve.

7. The method of claim 1 further comprising after the step of sliding the foot sleeve toward the floor, inserting a fastener through the foot sleeve into the side support panel.

8. The method of claim 1, wherein the foot sleeve is contiguous with the side support panel about an entire periphery of the side support panel.

9. The method of claim 1, wherein the side support panel is a first side support panel and the foot sleeve is a first foot sleeve, the method further comprising:

placing a second foot sleeve around a bottom portion of a second side support panel, the second foot sleeve comprising:

a first sidewall configured to extend alongside an outer face of the second side support panel;

a second sidewall configured to extend alongside an inner face of the second side support panel that faces opposite the outer face of the second foot sleeve; and an end wall configured to extend along a front face of the second side support panel, the end wall of the second foot sleeve connecting the first and second sidewalls of the second foot sleeve;

wherein the first and second sidewall and end wall of the second foot sleeve define a another volume that is sized to receive the second side support panel;

mounting the second side support panel to the wall such that the second side support panel extends in the vertical direction and is parallel to the first side support panel and perpendicular to the wall; and sliding the second foot sleeve toward the floor beneath the second side support panel to cover another gap between the second side support panel and the floor.

10. The method of claim 9, wherein after the step of sliding the second foot sleeve toward the floor, the first sidewall of the second foot sleeve engaging the outer face of the second side support along an entire length.

11. The method of claim 9, wherein the end wall is a first end wall of the second foot sleeve, the second foot sleeve comprising a second end wall at an end opposite the first end wall of the second foot sleeve.

12. The method of claim 9, wherein the another volume is open at an end opposite the first end wall of the second foot sleeve.

13. The method of claim 9, wherein the second foot sleeve comprises a bottom wall that covers a bottom area of the another volume.

14. The method of claim 9, wherein the another volume is open at a bottom of the second foot sleeve.

15. The method of claim 9, wherein the second foot sleeve is contiguous with the second side support panel about an entire periphery of the second side support panel.

* * * * *